(12) United States Patent
He et al.

(10) Patent No.: US 12,276,317 B2
(45) Date of Patent: Apr. 15, 2025

(54) HYDRAULIC DAMPING DEVICE WITH ADJUSTABLE RESISTANCE AND A RIDING PLATFORM

(71) Applicant: SHENZHEN THOUSANDSHORES TECHNOLOGY CO., LTD., Shenzhen (CN)

(72) Inventors: Ding He, Shenzhen (CN); Zhi Liu, Shenzhen (CN); Xin Li, Shenzhen (CN)

(73) Assignee: SHENZHEN THOUSANDSHORES TECHNOLOGY CO., LTD., Shenzhen (CN)

( * ) Notice: Subject to any disclaimer, the term of this patent is extended or adjusted under 35 U.S.C. 154(b) by 367 days.

(21) Appl. No.: 17/703,099

(22) Filed: Mar. 24, 2022

(65) Prior Publication Data

US 2023/0148081 A1    May 11, 2023

(30) Foreign Application Priority Data

Nov. 8, 2021  (CN) .......................... 202111314419.0

(51) Int. Cl.
| | |
|---|---|
| *F16F 15/16* | (2006.01) |
| *A63B 69/16* | (2006.01) |
| *F16F 15/14* | (2006.01) |
| *F16F 15/167* | (2006.01) |

(52) U.S. Cl.
CPC ............ *F16F 15/161* (2013.01); *A63B 69/16* (2013.01); *F16F 15/14* (2013.01); *F16F 15/167* (2013.01); *A63B 2069/167* (2013.01); *F16F 2222/08* (2013.01); *F16F 2222/12* (2013.01); *F16F 2228/066* (2013.01); *F16F 2230/186* (2013.01); *F16F 2232/02* (2013.01); *F16F 2236/08* (2013.01)

(58) Field of Classification Search
CPC ........ F16F 15/161; F16F 15/14; F16F 15/167; F16F 2222/087; F16F 2222/12; F16F 2228/066; F16F 2230/186; F16F 2232/02; F16F 2236/08; F16F 9/12; F16F 9/125; A63B 69/16; A63B 2069/167; F16D 57/00; F16D 57/02
See application file for complete search history.

(56) References Cited

U.S. PATENT DOCUMENTS

| | | | |
|---|---|---|---|
| 6,843,758 B2 * | 1/2005 | Qiu ..................... | A63B 21/225 482/61 |
| 2017/0361649 A1 * | 12/2017 | Lin ........................ | B60B 3/082 |

\* cited by examiner

*Primary Examiner* — Sundhara M Ganesan
*Assistant Examiner* — Jacqueline N L Loberiza
(74) *Attorney, Agent, or Firm* — Porus IP LLC

(57) ABSTRACT

Disclosed is a hydraulic damping device level riding platform with adjustable resistance, which comprises a frame body, a shaft mechanism, a flywheel and a hydraulic damping mechanism, the shaft mechanism is arranged on the frame body, one end of the shaft mechanism is connected with the hydraulic damping mechanism and another end of the shaft mechanism is connected with the flywheel. The hydraulic damping mechanism comprises: a cavity; a rotating disc provided with blades, the rotating disc is arranged in the cavity; and a liquid level height adjusting mechanism movably connected inside the cavity to control a liquid level height in the cavity. The liquid level height of the liquid in the cavity is controlled through the liquid level height adjustment mechanism, so as to realize the control of the resistance of the rotating disc to the liquid.

6 Claims, 7 Drawing Sheets

HYDRAULIC DAMPING DEVICE WITH ADJUSTABLE RESISTANCE AND A RIDING PLATFORM

CROSS-REFERENCE TO RELATED APPLICATIONS

This application claims priority to Chinese Patent Application No. 202111314419.0, filed on Nov. 8, 2021. The content of all of which is incorporate herein by reference.

FIELD OF THE DISCLOSURE

The present disclosure relates to the mechanical field, in particular to a hydraulic damping device with adjustable resistance and a riding platform.

BACKGROUND

Damping device is a device that absorbs motion energy or provides motion resistance. The excellent energy absorption characteristics make it widely used in scientific research and application fields, especially in aerospace, aviation, military industry, gun, automobile and other industries. With the improvement of people's living standards and the rise of fitness industry. The damping device has also been rapidly popularized and applied in the fitness equipment industry. For example, a riding platform simulating riding training and the rowing machine simulating rowing training are equipped with damping devices.

According to the principle of generating resistance, common damping devices are roughly divided into three types, namely electromagnetic damping device, gas damping device and liquid damping device. The liquid damping device uses liquid to provide resistance. Because the liquid itself is smooth and soft, the resistance provided by liquid often has smooth characteristics, and the liquid damping device has no noise during operation. Therefore, the liquid damping device has been applied in many fields.

However, the liquid damping device in the prior art is often not able to adjust the resistance, or can only adjust the resistance by replacing the liquid with different viscosity, which not only consumes the labor of the user, but also has little effect on adjusting the resistance. The application of the liquid damping device is therefore limited and the satisfaction of the user with the use of the equipment related to the liquid damping device is weaken.

Therefore, the existing technology needs to be improved and developed.

BRIEF SUMMARY OF THE DISCLOSURE

In view of the shortcomings of the above prior art, the purpose of the present disclosure is to provide a hydraulic damping device with adjustable resistance and a riding platform, which aims to solve the problem that the resistance of the hydraulic damping device cannot be adjusted in the prior art.

The technical scheme of the present disclosure is as follows:

A hydraulic damping device with adjustable resistance, which includes a frame body, a shaft mechanism, a flywheel and a hydraulic damping mechanism, the shaft mechanism is arranged on the frame body, one end of the shaft mechanism is connected with the hydraulic damping mechanism and another end of the shaft mechanism is connected with the flywheel. The hydraulic damping mechanism includes:

a cavity;

a rotating disc provided with blades, the rotating disc is arranged in the cavity; and a liquid level height adjusting mechanism movably connected inside the cavity to control a liquid level height in the cavity.

In the liquid damping device with adjustable resistance, the liquid level height adjusting mechanism is an adjusting disc, and a recess is arranged on the adjusting disc.

In the hydraulic damping device with adjustable resistance, the recess comprises at least one through hole.

In the hydraulic damping device with adjustable resistance, an adjusting rod is arranged on the adjusting disc, and the adjusting rod extends to an outside of the cavity.

In the hydraulic damping device with adjustable resistance, an inner sleeve is arranged in the cavity.

In the hydraulic damping device with adjustable resistance, at least one interface is arranged on the frame body corresponding to a position of the shaft mechanism.

In the hydraulic damping device with adjustable resistance, further includes a first housing and a second housing which are detachably connected with each other, and a first adjusting groove is arranged on the first housing.

In the liquid damping device with adjustable resistance, the liquid level height adjustment mechanism is a slider.

In the hydraulic damping device with adjustable resistance, a magnet is arranged on the slider.

The present disclosure also provides a riding platform, which includes a support frame, the support frame is connected with the hydraulic damping device with adjustable resistance as described above.

Beneficial effects: the disclosure provides a hydraulic damping device with adjustable resistance and a riding platform, the hydraulic damping device with adjustable resistance includes a frame body, a shaft mechanism, a flywheel and a hydraulic damping mechanism, the shaft mechanism is arranged on the frame body, one end of the shaft mechanism is connected with the hydraulic damping mechanism and another end of the shaft mechanism is connected with the flywheel. The hydraulic damping mechanism includes a cavity; a rotating disc provided with blades, the rotating disc is arranged in the cavity; and a liquid level height adjusting mechanism movably connected inside the cavity to control a liquid level height in the cavity. The present disclosure controls the liquid level height of the liquid in the cavity through the liquid level height adjustment mechanism, so as to control the depth of the rotating disc immersed in the liquid, and to realize the control of the resistance between the rotating disc and the liquid.

DETAILED DESCRIPTION OF EMBODIMENTS

In order to make the purpose, technical scheme and effect of the present disclosure clear and definite, the present disclosure is further described in detail with reference to the attached drawings and embodiments. It should be understood that the embodiments described herein are only used to explain the present disclosure and are not used to limit the present disclosure.

Figure 1:
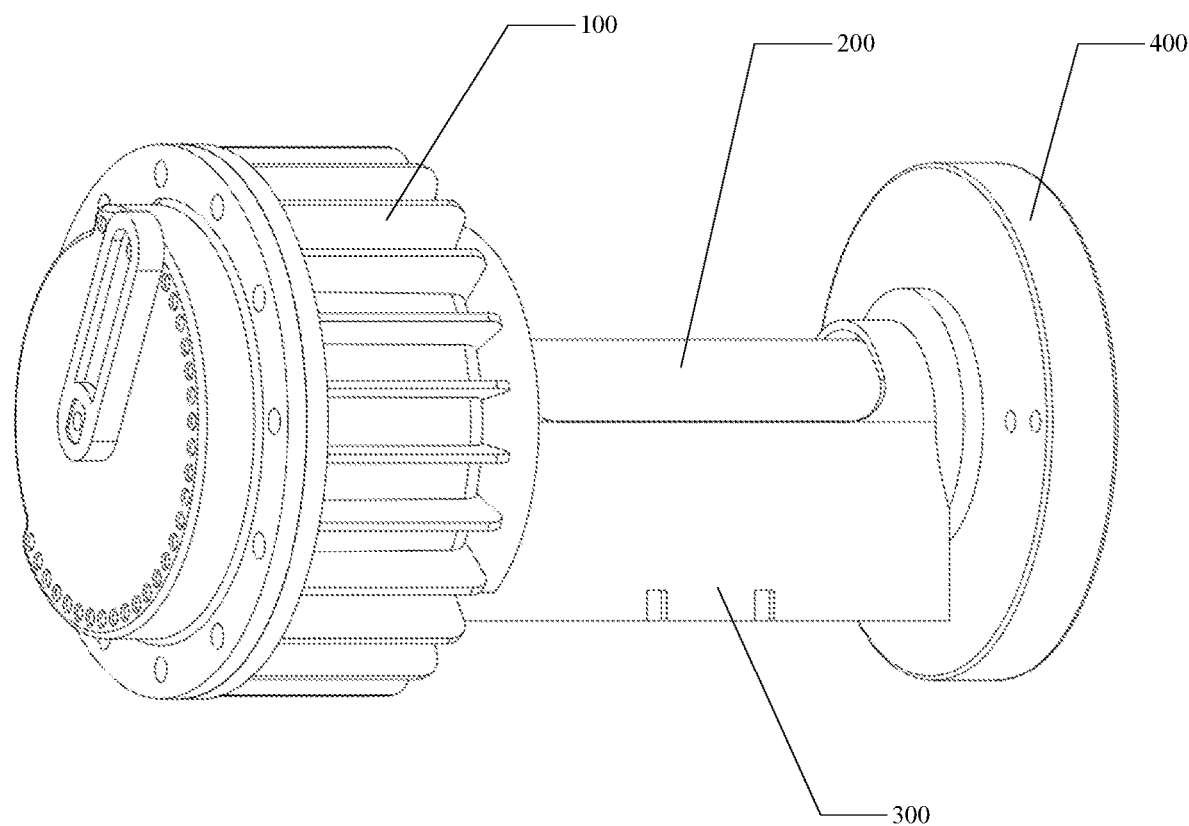
FIG. 1 is a structural diagram of a hydraulic damping device with adjustable resistance according to the present disclosure.
Figure 2:
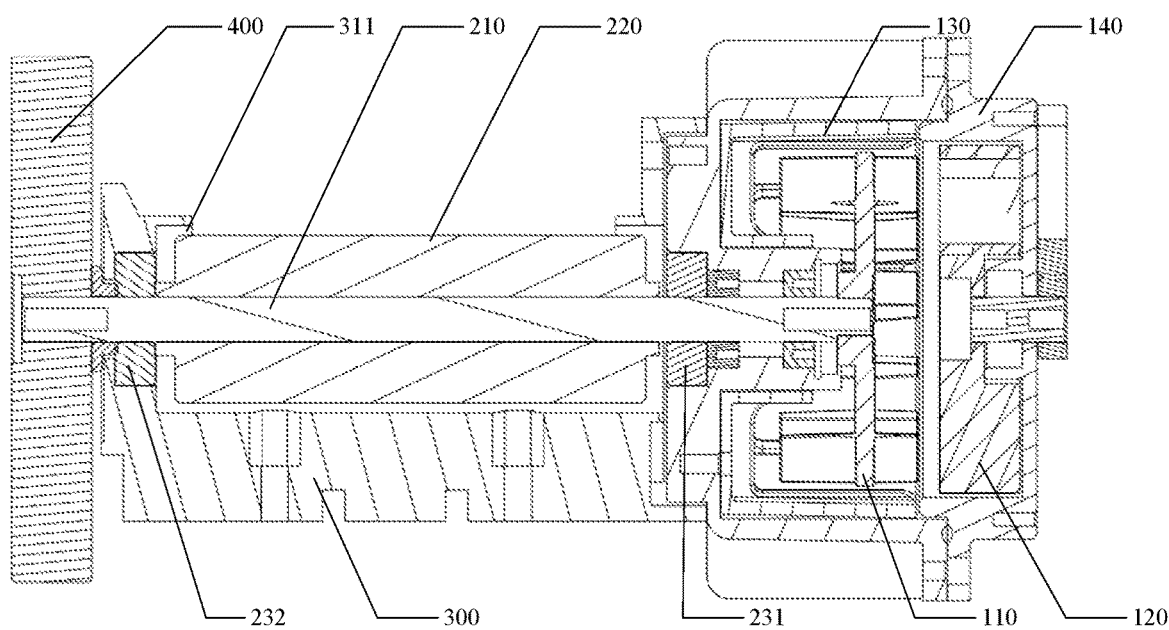
FIG. 2 is a sectional view of the hydraulic damping device with adjustable resistance according to an embodiment of the present disclosure.

The present disclosure provides a hydraulic damping device with adjustable resistance, as shown in FIG. 1 and FIG. 2. The hydraulic damping device with adjustable resistance includes a frame body 300, a shaft mechanism 200, a flywheel 400 and a hydraulic damping mechanism 100. One end of the shaft mechanism 200 is connected with the hydraulic damping mechanism 100, and another end of the shaft mechanism 200 is connected with the flywheel 400. Therefore, through the operation of the hydraulic damping mechanism 100 and the rotation of the flywheel 400, a smooth and continuous resistance can be provided for the hydraulic damping device with adjustable resistance. The shaft mechanism 200 is arranged on the frame body 300, so the hydraulic damping device with adjustable resistance can be flexibly arranged in different places or equipped on different equipment through the frame body 300. For example, the hydraulic damping device with adjustable resistance may be fixed on the wall, the ground and other places through the frame body 300.

Figure 3:
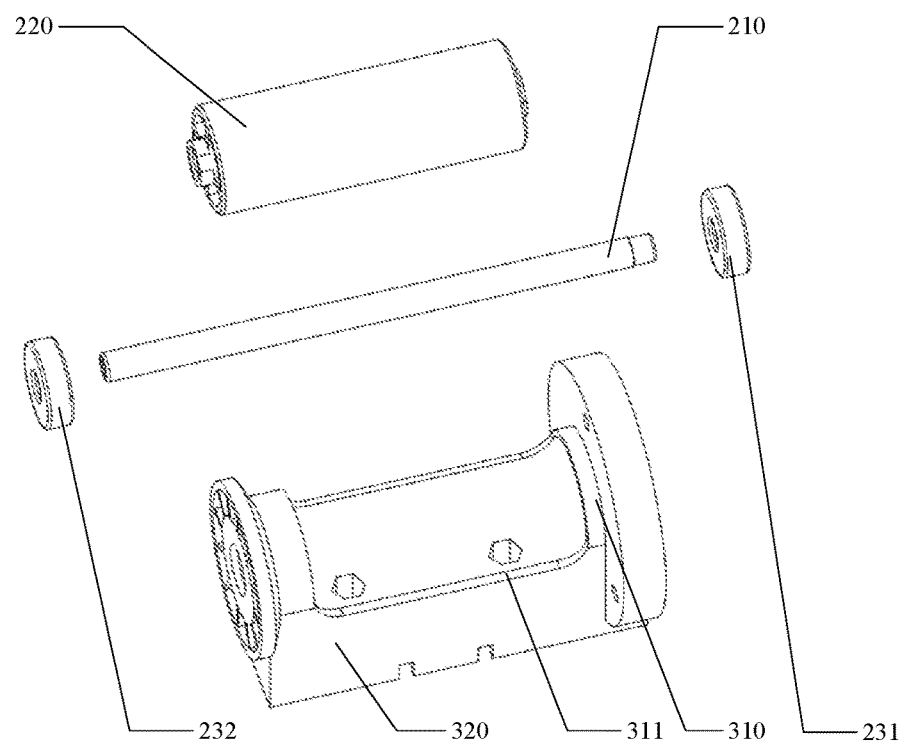
FIG. 3 is an exploded view of a frame body and a shaft mechanism according to the present disclosure.

As shown in FIG. 2 and FIG. 3, the frame body 300 is provided with an interface 311 corresponding to a position of the shaft mechanism 200, so that the heat generated by the shaft mechanism 200 during rotation can be released outward through the interface 311 to reduce the temperature of the shaft mechanism 200. The interface 311 can also be used to connect the hydraulic damping device with adjustable resistance to an external equipment, to help the external equipment obtain resistance or to offset the energy generated by the external equipment.

As shown in FIG. 3, the shaft mechanism 200 may include a shaft rod 210, a first rolling bearing 231 and a second rolling bearing 232. For example, the first rolling bearing 231 is arranged at one end of the frame body 300, and the second rolling bearing 232 is arranged at another end of the frame body 300. The shaft rod 210 is movably connected to the frame body 300 through the first rolling bearing 231 and the second rolling bearing 232, so that the shaft rod 210 can rotate smoothly with low wear. At least one sleeve 220 may be sleeved on an outside of the shaft rod 210, and different connecting mechanisms can be arranged on the outside of the sleeve 220 to realize connection with external equipment in various connection modes. For example, the shaft rod 210 is sleeved with a first sleeve and a second sleeve, and an outer side of the first sleeve is provided with strip anti-skid lines. The first sleeve can be used for being contacted with the external equipment and being rotated to obtain resistance. The outside of the second sleeve is provided with a gear, and the second sleeve can be used for being connected with the external equipment through the gear and a chain to obtain resistance. The hydraulic damping device with adjustable resistance can be connected with external equipment in various connection forms, which expands the application range.

Blades in fan-shaped can be arranged on both ends of the sleeve 220, therefore the resistance may be generated by the friction between the blades and air when the shaft rod 210 drives the sleeve 220 to rotate, to increase the resistance of the resistance adjustable liquid damping device. When the blades rotate, wind may also be generated to accelerate the heat dissipation speed of the shaft mechanism 200. For example, the wind generated by the sleeve 220 driving the blades accelerates the release of heat generated by the shaft rod 210, the first rolling bearing 231 and the second rolling bearing 232 due to friction. And the external equipment connected to the shaft mechanism 200 is also cooled, to prevent the external equipment from overheating and aging.

Figure 4:
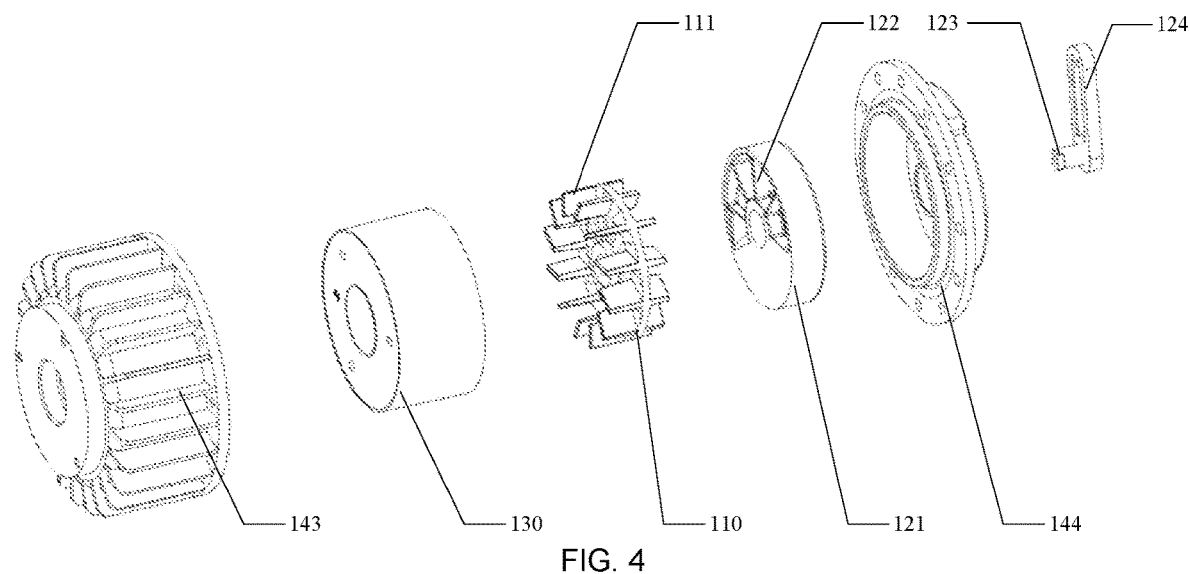
FIG. 4 is an exploded view of a hydraulic damping mechanism according to an embodiment of the present disclosure.

As shown in FIG. 2 and FIG. 4, the liquid damping mechanism includes a cavity 140, a rotating disc 110 and a liquid level height adjusting mechanism 120. The cavity 140 is connected with the frame body 300, and liquid is installed in the cavity 140. Therefore, the rotation of the rotating disc 110 in the liquid provides resistance for the hydraulic damping mechanism 100. The damping liquid in the cavity 140 refers to substance having flow property similar to liquid, such as various liquid, solid-liquid mixture, particulate materials, etc. The liquid in the cavity 140 does not completely fill a space in the cavity 140. For example, silicone oil with a space ratio of 50% is injected into the cavity 140 to make a part of the rotating disc 110 contact with the liquid, so as to adjust the resistance of the rotating disc 110 by adjusting the height of the damping liquid contacted by the rotating disc 110, to control the output resistance of the hydraulic damping device with adjustable resistance.

Figure 13:
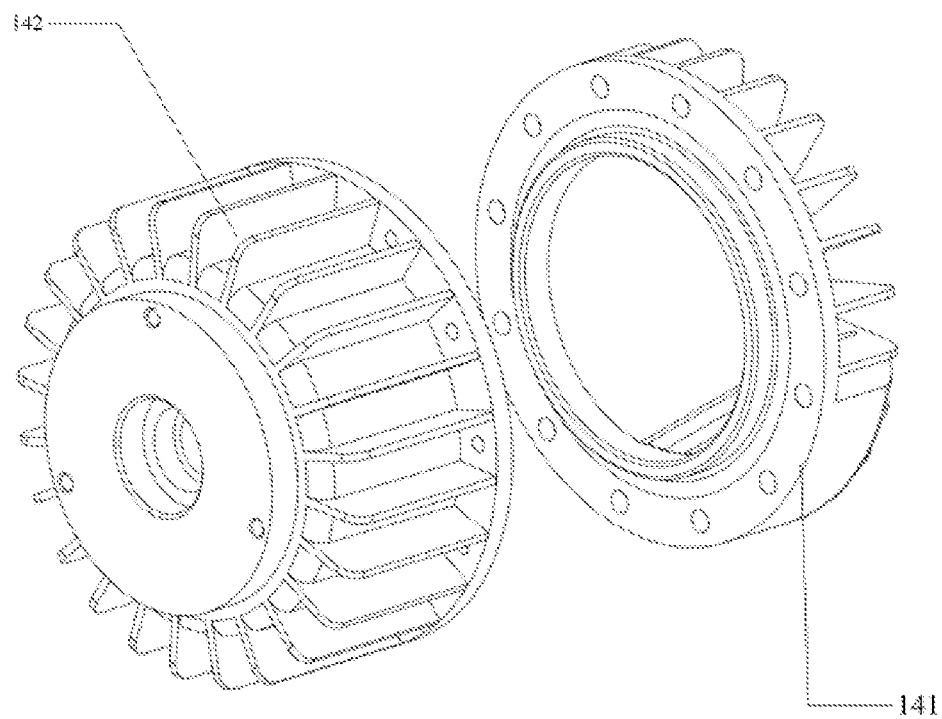
FIG. 13 is an exploded view of the cavity according to the present disclosure.
Figure 14:
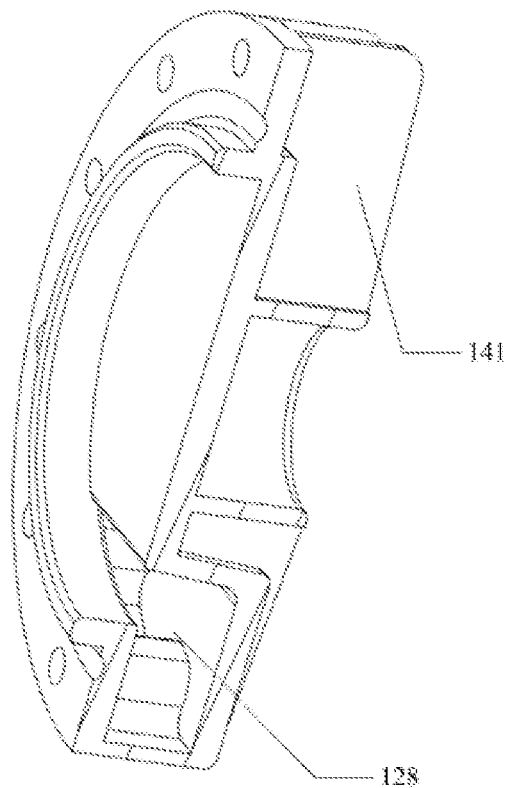
FIG. 14 is a sectional view of the first housing according to the present disclosure.

As shown in FIG. 13 and FIG. 14, the cavity 140 can be composed of a first housing 141 and a second housing 142. The second housing 142 is connected with the frame body 300, the second housing 142 is detachably connected with the first housing 141, and the first housing 141 is rotatably connected with the second housing 142. A first adjusting groove 128 is arranged on one side of the first housing 141 facing the second housing 142. User may rotate the first housing 141 to adjust a position of the first adjusting groove 128 in the cavity 140 according to resistance requirement, therefore the height of the liquid level of the damping liquid in the cavity 140 is adjusted to adjust the resistance. For example, the first adjusting groove 128 is located on a top of the cavity 140 at first, user may rotate the first housing 141 clockwise for 180 degrees to locate the first adjusting groove 128 on a bottom of the cavity 140. The damping liquid is then flowed into the first adjusting groove 128 to lower the liquid level height of the damping liquid in the cavity 140, thus the resistance is reduced when the rotating disc 110 rotates in the damping liquid. It would be easy and cost little for arranging a first adjusting groove 128 on the first housing 141. For example, the first adjusting groove 128 may be rapidly manufactured by stamping and forming method. The operation of rotating the first adjusting groove 128 by rotating the first housing 141 is simple, there would be no need for providing training for the user.

As shown in FIG. 4, the cavity 140 may be composed of a third housing 143 and a fourth housing 144. The third housing 143 is connect with the frame body 300, and the third housing 143 is detachably connected with the fourth housing 144, so that it would be convenient for the user to change the damping liquid in the cavity 140 or to maintain the components in the cavity 140 such as the rotating disc 110 and the adjusting disc 121.

As shown in FIG. 2, the rotating disc 110 is connected with the shaft rod 210. For example, the shaft rod 210 is connected to a center position of the rotating disc 110 so that the rotating disc 110 can rotate synchronously with the shaft rod 210. Therefore, the resistance between the rotating disc 110 and the damping liquid is transmitted to external equipment through the shaft mechanism 200. The shaft rod 210 may indirectly drive the rotating disc 110 to rotate synchronously through magnetic force. For example, a magnet is connected with the shaft rod 210, another magnet is connected with the rotating disc 110. When the shaft rod 210 starts to rotate, the rotating disc rotates under the magnetic force.

As shown in FIG. 4, the rotating disc 110 is provided with a plurality of blades 111. The blades 111 rotate synchronously with the rotating disc 110 when the rotating disc 110 rotates under the drive of an external device. The resistance is generated through the interaction between the blades 111 and the damping liquid in the cavity 140. The blades 111 can also be connected with the rotating disc 110 at an adjustable angle, so that the resistance between the rotating disc 110 and the damping liquid can be adjusted. For example, the blades 111 arranged at a certain angle relative to the rotating disc 110 is detachably connected to the rotating disc 110 through screws, and the user may connect the blades 111 at another angle relative to the rotating disc 110, so that the resistance between the blades 111 and the damping liquid varies according to the blades 111 having different angles, and the resistance output can be different. When the blades 111 rotate with the rotating disc 110, the blades 111 above the liquid level may disturb the air to generate wind, thereby cooling the cavity 140.

As shown in FIG. 4, the liquid level height adjusting mechanism 120 is arranged in the cavity 140 to control the liquid level height of the damping liquid in the cavity 140. Therefore, when the rotating disc 110 rotates in the damping liquid at a fixed speed, the deeper the liquid level height of the rotating disc 110 immersed in the liquid, the greater the resistance between the damping liquid and the rotating disc 110. The shallower the liquid level of the rotating disc 110 immersed in the liquid, the smaller the resistance between the rotating disc 110 and the damping liquid. Therefore, the value of the resistance can be controlled by adjusting the liquid level height of the damping liquid through the liquid level height adjusting mechanism 120.

Figure 5:
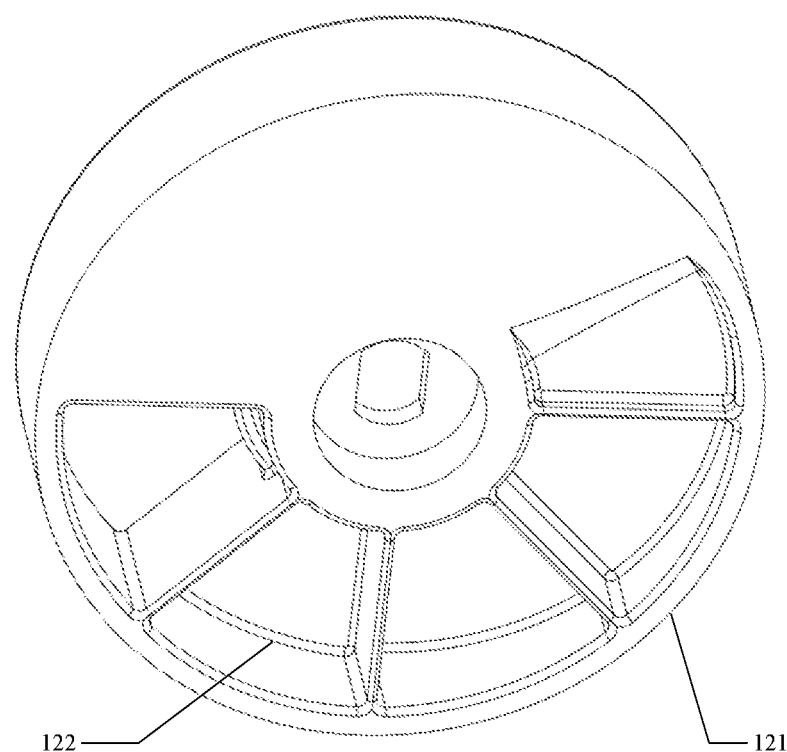
FIG. 5 is a structural diagram of the adjusting disc according to the present disclosure.
Figure 6:
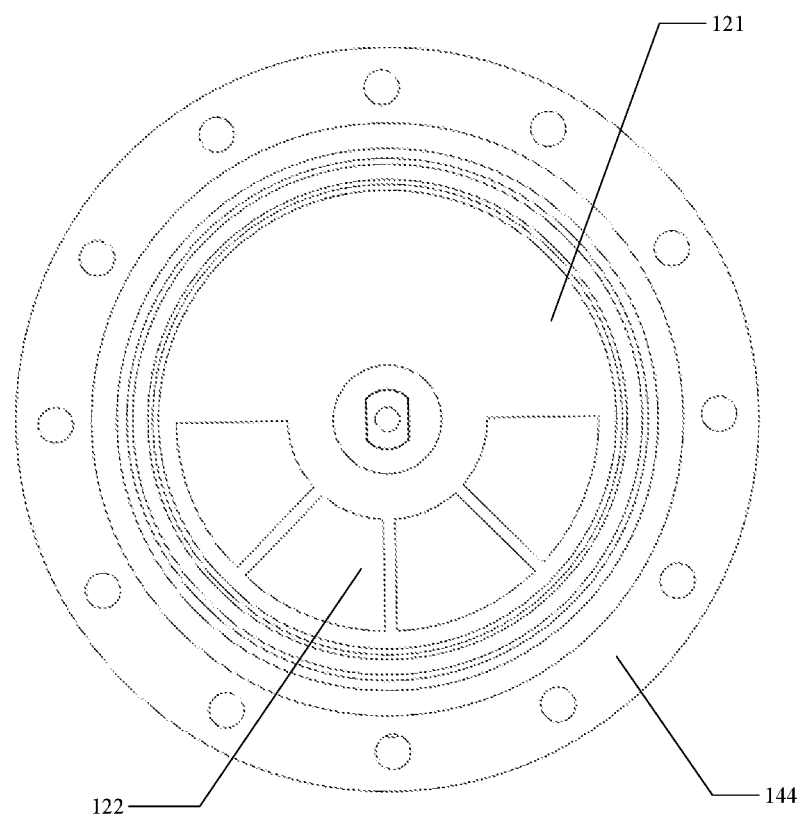
FIG. 6 is a structural diagram of the adjusting disc with a recess being at a lower end of the cavity according to the present disclosure.
Figure 7:
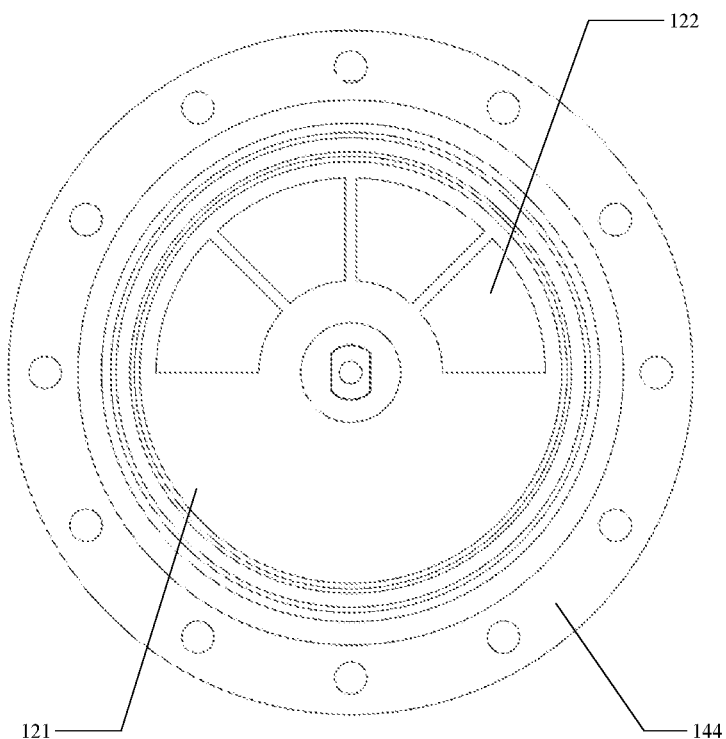
FIG. 7 is a structural diagram of the adjusting disc with a recess being at an upper end of the cavity according to the present disclosure.

As shown in FIG. 5, the liquid level height adjusting mechanism 120 may be an adjusting disc 121, on which at least one recess 122 is arranged. The recess 122 may be a groove with a gradually deepening volume recessed into the adjusting disc 121, so as to control the liquid level height in the cavity 140 by controlling the volume of the recess 122 immersed in the liquid, Therefore the liquid level height of the damping liquid in the cavity 140 is controlled to adjust the resistance when rotating the rotating disc 110. Taking the liquid damping device of a fitness equipment riding platform as an example, the adjusting disc of the liquid damping device of the riding platform is provided with the recess 122. As shown in FIG. 6, rotate the adjusting disc 121 so that the recess 122 is located at the lower end of the cavity 140 and immersed in the damping liquid. The damping liquid flows into the space in the recess 122, and the liquid level height is low, the resistance received by the rotating disc 110 during rotation is small, which can meet the entertainment experience for users such as children, to ride quickly with less force. As shown in FIG. 7, rotate the adjusting disc 121 so that the recess 122 is located above the damping liquid, i.e. the plane part of the adjusting disc 121 immerses into the damping liquid, the liquid level height of the damping liquid in the cavity 140 rises, and the rotating disc 110 suffers great resistance from the damping liquid during rotation, which can meet the training purpose of adult users to overcome the resistance with great strength. Thus, personalized needs of different users are met by controlling the volume of the recess 122 of the rotating disc 110 immersed in the damping liquid to adjust the resistance of the liquid damping mechanism.

Figure 8:
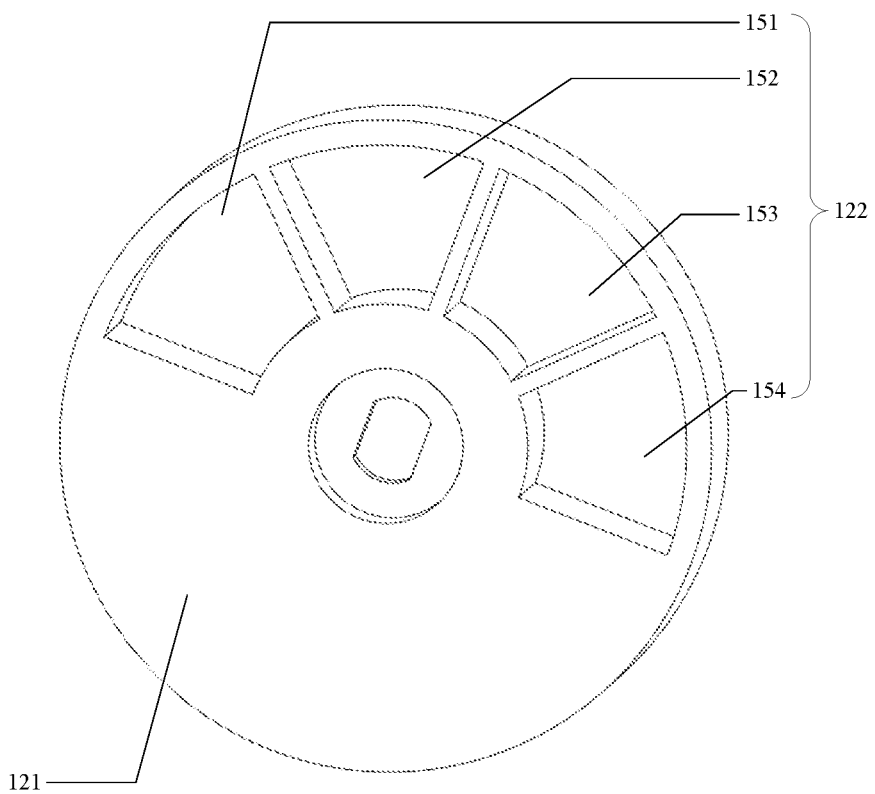
FIG. 8 is a structural diagram of the adjusting disc with a recess being a through hole according to the present disclosure.

As shown in FIG. 8, the recess 122 may be a through hole. Therefore, when rotating the adjusting disc 121 to adjust the liquid level height of the damping liquid, the liquid previously flowing into the through hole can quickly flow out of the through hole, so that the liquid level height of the damping liquid can quickly reach a corresponding height, so that the rotating disc 110 is quickly subjected to the resistance corresponding to the liquid level height.

As shown in FIG. 5, an adjusting rod 123 is arranged on the adjusting disc 121, and the adjusting rod 123 extends to the outside of the cavity 140 to facilitate the user to drive the adjusting disc 121 from outside by rotating the adjusting rod 123 to adjust the resistance in real time. For example, the adjusting rod 123 is arranged at the center of the adjusting disc 121, and the adjusting rod 123 extends out of the hydraulic damping device with adjustable resistance through the cavity formed by the shaft mechanism 200 and the flywheel 400, so that the user can rotate the adjusting rod 123 to control the resistance. The adjusting rod 123 may also extend to the outside of the hydraulic damping device with adjustable resistance through the fourth housing 144 to facilitate the user to rotate the adjusting rod 123 to adjust the resistance. The user can connect the adjusting rod 123 with an intelligent motor, and control a rotation degree of the motor to control the adjusting disc 121 to rotate a corresponding degree through the adjusting rod 123, so as to control the liquid level height in the cavity 140. The intelligent motor controls the rotation speed or rotation angle, which is a mature prior art and does not belong to the scope of the present disclosure. As shown in FIG. 4, a grip 124 may be arranged at one end of the adjusting rod 123 extending out of the hydraulic damping device with adjustable resistance, and one end of the grip 124 is locked with the cavity 140. Therefore, the user may manually adjust the adjusting rod 123 and fix the grip 124 after reaching a satisfactory effect, so as to ensure that the resistance effect remains unchanged and realize manually and quickly adjust the resistance without power, which is convenient for users.

Figure 9:
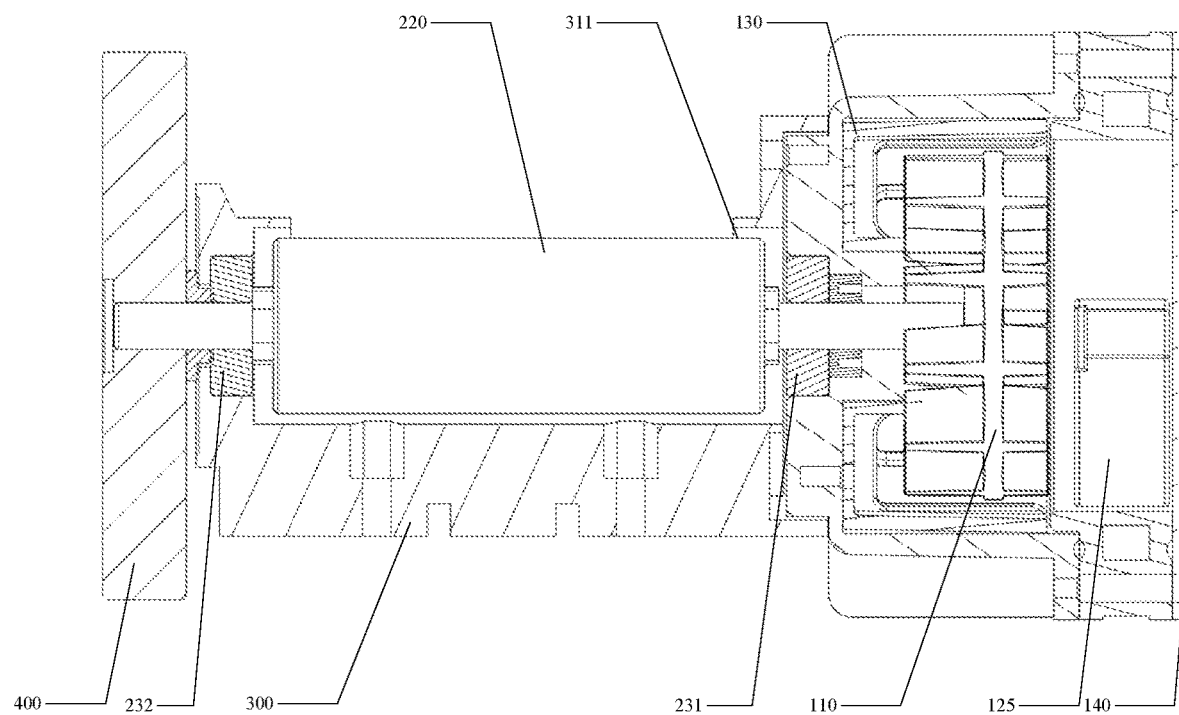
FIG. 9 is a partial sectional view of a hydraulic damping device with adjustable resistance according to another embodiment of the present disclosure.
Figure 10:
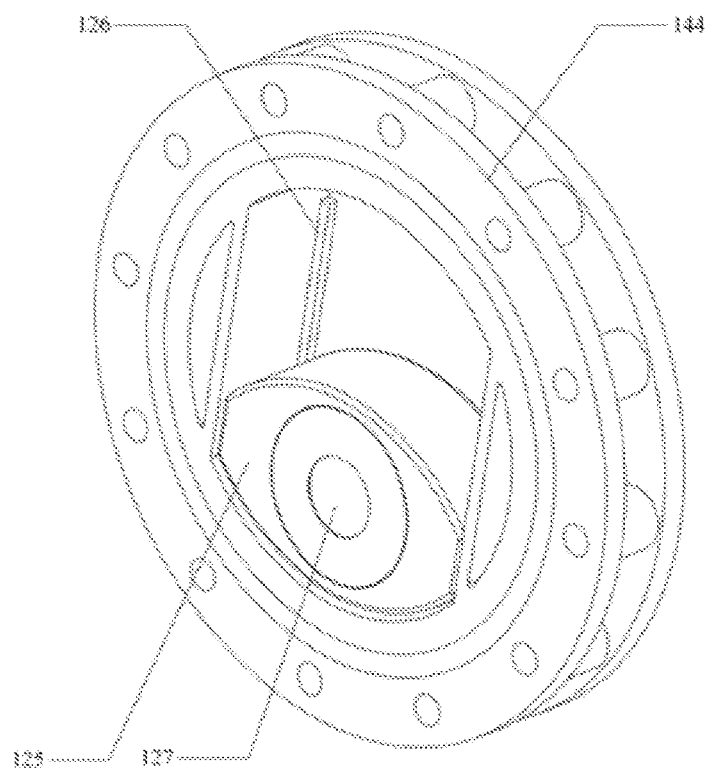
FIG. 10 is a structural diagram of a first housing and a slider according to the present disclosure.

As shown in FIGS. 9 and 10, the liquid level height adjusting mechanism 120 may be a slider 125 arranged in the cavity 140. The liquid level height in the cavity 140 is controlled through the volume of the slider 125 immersed in the liquid, so as to control the resistance between the rotating disc 110 and the damping liquid. For example, a slide path 126 is arranged on an inner side of the second housing 142 of the cavity 140, the slider 125 can slide in the slide path 126. A magnet 127 is arranged on the slider 125, so that the user can control the movement of the slider 125 along the slide path 126 through another magnet outside the hydraulic damping device with adjustable resistance to change the liquid level height in the cavity 140. That is, the larger the volume of the slider 125 immersed in the liquid, the higher the liquid level of the damping liquid, and the greater the resistance for the rotating disc 110. The direction of the movement of the slider 125 in the cavity 140 is not limited. For example, the slider 125 may slides toward or away from the rotating disc 110. The height of the slider 125 is greater than the liquid level height in the cavity 140 when the slider 125 is closest to the rotating disc 110. Therefore, when the slider 125 slides toward the rotating disc 110, the liquid level height of the damping liquid increases gradually, and the volume of the rotating disc 110 immersed in the damping liquid raises which leads to a greater resistance between the rotating disc 110 and the damping liquid. When the slider 125 slides away from the rotating disc 110, the liquid level height of the damping liquid decreases, which leads a less resistance between the rotating disc 110 and the damping liquid. By the simple operation of sliding the slider 125 in the cavity 140, the resistance between the rotating disc 110 and the damping liquid may be adjusted.

Figure 11:
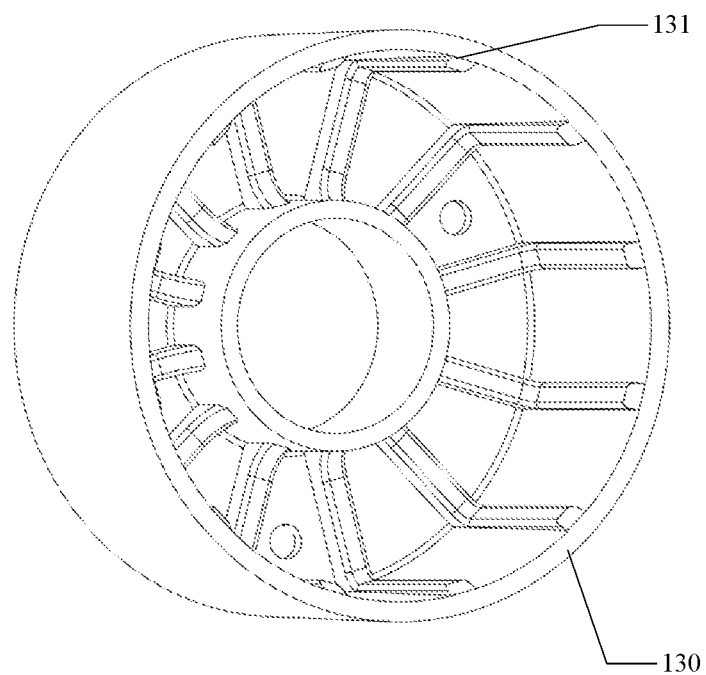
FIG. 11 is a structural diagram of an inner sleeve according to the present disclosure.

As shown in FIG. 2 and FIG. 11, an inner sleeve 130 is arranged inside the cavity 140. The inner sleeve 130 is detachably arranged on the inner side of the cavity 140. The inner sleeve 130 can be any shape, such as conical and cylindrical, so as to adjust the resistance between the rotating disc 110 and the damping liquid with different shapes cooperating with the liquid level height adjusting mechanism 120. An inner side of the inner sleeve 130 may also be provided with a resistance rib 131, which can be various structures, such as spiral stripe, concave convex structure, etc., to cooperate with the liquid level height adjusting mechanism 120 to increase the resistance effect.

A second adjusting groove may be arranged on the inner sleeve 130. The user may adjust a position of the second adjusting groove in the cavity 140 by rotating the inner sleeve 130, to control the liquid level height of the damping liquid in the cavity 140 and adjust the resistance. For example, the second adjusting groove is arranged on a bottom of the cavity 140 at first, the user may rotate the inner sleeve 130 to locate the second adjusting groove on a top of the cavity 140 and fixed the inner sleeve 130 in the cavity 140. Thus the liquid level of the damping liquid raises and the resistance between the rotating disc 110 and the damping liquid increases.

Figure 12:
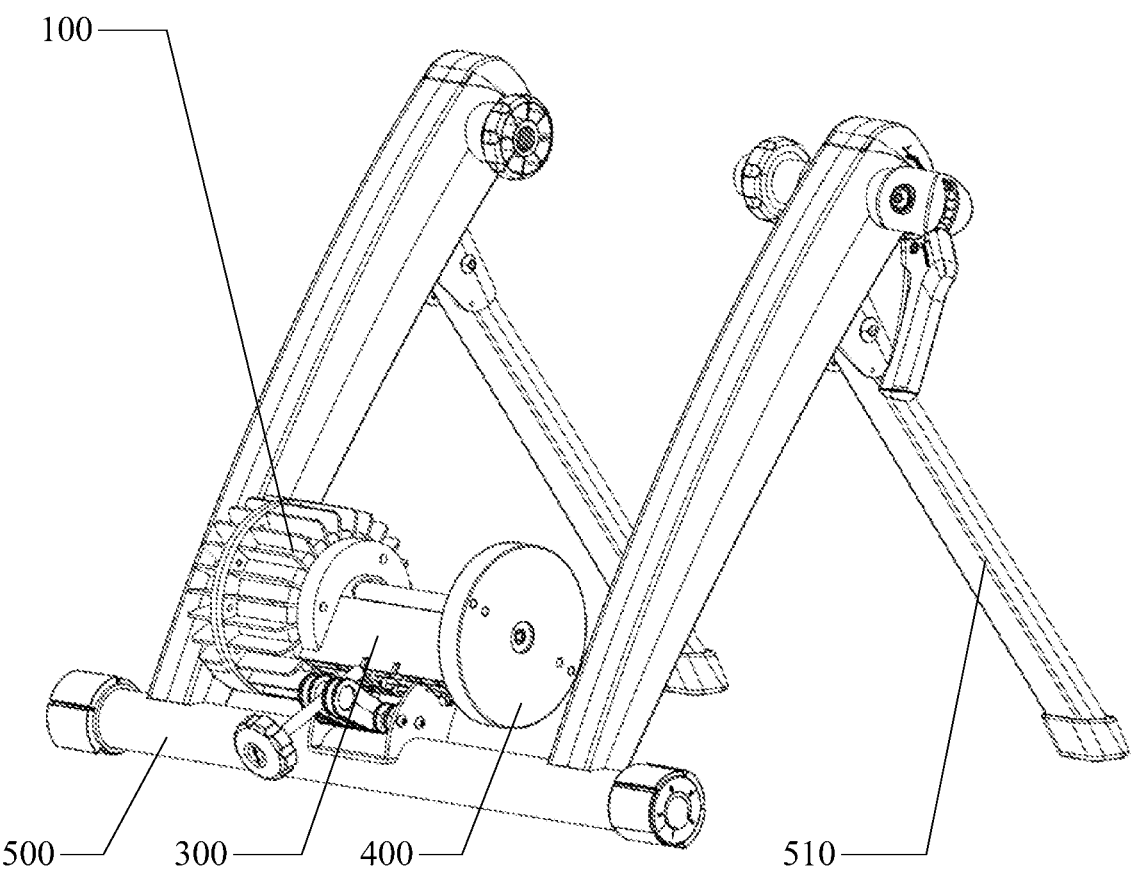
FIG. 12 is a structural diagram of a riding platform according to the present disclosure.

As shown in FIG. 12, the present disclosure also provides a riding platform 500. The riding platform includes a support frame 510 and a hydraulic damping device with adjustable resistance. The structural characteristics and corresponding technical effects of the hydraulic damping device with adjustable resistance are the same as those described above and will not be repeated here. When the user is trained through the riding platform 500, the user may adjust the resistance according to their own training requirements or training plan during any period of the training, and carry out targeted personalized training.

In order to explain the hydraulic damping device with adjustable resistance and the riding platform of the present disclosure, an embodiment is taken as an example.

As shown in FIG. 12, a riding platform 500 is provided. The riding platform 500 includes a support frame 510 and a hydraulic damping device with adjustable resistance. The hydraulic damping device with adjustable resistance is arranged at the bottom end of the support frame 510. The support frame 510 is used to fix the bicycle so that the rear wheel of the bicycle contacts the hydraulic damping device with adjustable resistance. The user may ride the bicycle stably so that the user can ride the bicycle in place. The rear wheel of the bicycle obtains a smooth resistance of the approximate riding bicycle from the hydraulic damping device with adjustable resistance, so that the user can obtain a approximate riding feeling indoors.

As shown in FIG. 1 and FIG. 3, the hydraulic damping mechanism with adjustable resistance includes a frame body 300, the frame body 300 includes a fixed frame 320 and a connecting frame 310, the fixed frame 320 is used to connect with the support frame 510. The fixed frame 320 may be connected with the support frame 510 at an adjustable angle and position, so that the rear tire of the bicycle can accurately contact the hydraulic damping mechanism with adjustable resistance. The connecting frame 310 is arranged at the upper end of the fixed frame 320, and the connecting frame 310 is a cylindrical structure. One end of the connecting frame 310 is provided with a first rolling bearing 231, the other end of the connecting frame 310 is provided with a second rolling bearing 232, and a shaft rod 210 is movably connected with the connecting frame 310 through the first rolling bearing 231 and the second rolling bearing 232. Thus, the shaft rod 210 can rotate smoothly with low wear.

As shown in FIG. 2 and FIG. 3, the shaft rod 210 is covered with a sleeve 220, which is used to be in contact with the rear tire of the bicycle. When the rear tire of the bicycle contacts and rotates with the sleeve 220, the sleeve 220 is driven to rotate synchronously, so as to drive the shaft rod 210 to rotate, and obtain the resistance from the hydraulic damping device with adjustable resistance. The outer side of the sleeve 220 is provided with anti-skid stripes for stable contact between the rear tire of the bicycle and the sleeve 220 to prevent slipping and wear of the rear tire of the bicycle. The connecting frame 310 is provided with an interface 311 corresponding to a position of the sleeve 220 so that the rear tire of the bicycle is in contact with the sleeve 220.

As shown in FIG. 1 and FIG. 2, one end of the connecting frame 310 facing the cavity 140 is provided with an outward extending edge, and the position of the cavity 140 corresponding to the edge is provided with a protrusion adapted to the edge, so that the protrusion is clamped into the edge to increase the stability of the connection between the frame body 300 and the cavity 140.

As shown in FIG. 4, the cavity is composed of the third housing 143 and the fourth housing 144 which are detachably connected with each other to facilitate the user to replace the silicone oil in the cavity 140. A sealing ring is arranged between the third housing 143 and the fourth housing 144 to prevent silicone oil leak from the cavity 140. The silicone oil in the cavity 140 accounts for one-half of the volume of the cavity 140, thereby the resistance is provided to the liquid damping mechanism through the silicone oil.

As shown in FIG. 2 and FIG. 4, a rotating disc 110 is connected with a shaft rod 210 extending into the cavity 140. A plurality of blades 111 are arranged radially on the rotating disc 110, so that the resistance is obtained when the blades 111 contacts the silicone oil in the cavity 140. When the rotating disc 110 rotates, the blades 111 located above the silicone oil may generate wind during rotation to reduce the temperature in the cavity 140.

As shown in FIG. 4 and FIG. 8, an adjusting disc 121 is also arranged on one side of the fourth housing 144. The adjusting disc 121 is provided with a first through hole 151, a second through hole 152, a third through hole 153 and a fourth through hole 154. An adjusting rod 123 is arranged on the central position of the adjusting disc 121, which extends to the outside through the second housing 142 and is controlled by a grip. The fourth housing 144 is provided with a positioning hole corresponding to the position of the grip. When the user needs to train under large resistance, rotate the grip to rotate the adjusting disc 121, immerse a non-through hole portion of the adjusting disc 121 into silicone oil to maximize the liquid level in the cavity 140, and fix the grip 124 on the second housing 142 through the positioning hole to ensure that the adjusting disc 121 is fixed relative to the second housing 142 and the liquid level of the silicone oil in the cavity 140 is stabilized. When the user is riding, the rotating disc 110 suffers a large resistance from the silicone oil, and the user obtains the corresponding resistance. When the user needs to reduce the difficulty of training, the user rotates the grip 124 and adjusts the rotating disc 110 so that the first through hole 151 and the second through hole 152 are immersed in the silicone oil, the silicone oil flows into the first through hole 151 and the second through hole 152 and the liquid level height is reduced, therefore the resistance of the rotating disc 110 from the silicone oil is reduced during rotation and the user would train under the reduced resistance. When the user would like to further reduce the riding resistance, rotate the grip so that the first through hole 151, the second through hole 152 and the third through hole 153 are all immersed in the silicone oil, the silicone oil quickly enters the third through hole 153, and the liquid level height of the silicone oil is further reduced. Therefore the resistance received by the rotating disc 110 is correspondingly reduced during rotation, and the training needs of users with small resistance can be realized.

The present disclosure provides a hydraulic damping device with adjustable resistance. The hydraulic damping device with adjustable resistance includes a frame body 300, a shaft mechanism 200, a flywheel 400 and a hydraulic damping mechanism 100. The shaft mechanism 200 is arranged on the frame body 300, and the flywheel 400 and the hydraulic damping mechanism 100 are respectively arranged at both ends of the frame body 300. Thus, a smooth resistance is provided for the hydraulic damping mechanism with adjustable resistance. The hydraulic damping mechanism includes a cavity 140, a rotating disc 110 and a liquid level height adjusting mechanism 120. The cavity 140 is used to contain damping liquid to provide resistance to the rotating disc 110 when the rotating disc 110 rotates in the damping liquid. The rotating disc 110 is provided with a plurality of blades 111, and the angle of the blade 111 relative to the rotating disc 110 may be adjusted to obtain different resistance by adjusting the angle. The liquid level height adjusting mechanism 120 may be a adjusting disc 121 provided with a recess 122. By immersing the damping liquid into the recess 122 and changing the liquid level height of the damping liquid in the cavity 140, the resistance is controlled. The adjusting disc 121 is further provided with an adjusting rod 123, which extends out of the cavity 140. So that the user may control the resistance in real time outside the cavity 140 and the personalized needs of the user can be fulfilled. The liquid level height adjusting mechanism 120 may also be a slider 125, which can be movably connected in the cavity 140 through a slide path 126. The resistance is adjusted by controlling the liquid level height through adjusting the volume of the slider 125 immersed in the liquid, the structure is simple and the operation is convenient, and the resistance can be controlled in real time. The cavity 140 is also provided with an inner sleeve 130, which is detachably connected with the cavity 140, so that the user can replace the inner sleeve 130 according to the actual demand. The inner side of the inner sleeve 130 may be provided with a resistance rib 131 to increase the resistance effect. The inner sleeve 130 may further be provided with a second adjusting groove, and the liquid level height of the damping liquid in the cavity 140 is adjusted by changing the position of the second adjusting groove though rotating the inner sleeve 130. The cavity may be composed of a first housing 141 and a second housing 142. A first adjusting groove is arranged on the first housing 141. Therefore the resistance may be controlled by adjusting the liquid level height of the damping liquid while changing the position of the first adjusting groove in the cavity 140 through rotating the first housing 141. The present disclosure also provides a riding platform 500, which includes a support frame 510 and the hydraulic damping device with adjustable resistance. Therefore, the user can connect the riding device with the hydraulic damping device with adjustable resistance in a variety of ways, and the resistance can be adjusted by the liquid damping device with adjustable resistance, to meet the personalized needs of users or external devices.

It should be understood that the application of the present disclosure is not limited to the above embodiments. For those skilled in the art, it can be improved or transformed according to the above description. All these improvements and transformations should belong to the protection scope of the appended claims of the present disclosure.

What is claimed is:
1. A hydraulic damping device with adjustable resistance, comprising:
   a frame body;
   a shaft mechanism;
   a flywheel; and
   a hydraulic damping mechanism,
   wherein the shaft mechanism is arranged on the frame body, one end of the shaft mechanism is connected with the hydraulic damping mechanism and another end of the shaft mechanism is connected with the flywheel,
   wherein the hydraulic damping mechanism comprising:
   a cavity;
   a rotating disc provided with blades, wherein the rotating disc is arranged in the cavity; and
   an adjusting disc movably connected inside the cavity to control a liquid level height in the cavity,
   wherein a recess is arranged on the adjusting disc,
   wherein the recess comprises at least one through hole,
   wherein an adjusting rod is arranged on the adjusting disc, and the adjusting rod extends to an outside of the cavity, and
   wherein an inner sleeve is arranged in the cavity.
2. The hydraulic damping device with adjustable resistance according to claim 1, wherein at least one interface is arranged on the frame body corresponding to a position of the shaft mechanism.
3. The hydraulic damping device with adjustable resistance according to claim 2, further comprising a first housing and a second housing which are detachably connected with each other, and a first adjusting groove is arranged on the first housing.

4. The hydraulic damping device with adjustable resistance according to claim 1, wherein the adjusting disc is a slider.

5. The hydraulic damping device with adjustable resistance according to claim 4, wherein a magnet is arranged on the slider.

6. A riding platform comprising a support frame, wherein the support frame is connected with the hydraulic damping device with adjustable resistance comprising a frame body, a shaft mechanism, a flywheel and a hydraulic damping mechanism, the shaft mechanism is arranged on the frame body, one end of the shaft mechanism is connected with the hydraulic damping mechanism and another end of the shaft mechanism is connected with the flywheel, the hydraulic damping mechanism comprises:
- a cavity;
- a rotating disc provided with blades, wherein the rotating disc is arranged in the cavity; and
- an adjusting disc movably connected inside the cavity to control a liquid level height in the cavity;
- wherein a recess is arranged on the adjusting disc,
- wherein the recess comprises at least one through hole,
- wherein an adjusting rod is arranged on the adjusting disc, and the adjusting rod extends to an outside of the cavity, and
- wherein an inner sleeve is arranged in the cavity.

* * * * *